(12) United States Patent
Johansson et al.

(10) Patent No.: US 10,270,563 B2
(45) Date of Patent: Apr. 23, 2019

(54) METHOD AND NETWORK NODE FOR ALLOCATING RESOURCES OF AN UPLINK SUBFRAME

(75) Inventors: Anders Johansson, Hässelby (SE); Leo Lightstone, Ottawa (CA); Alfred Schmidt, Kanata (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 130 days.

(21) Appl. No.: 14/412,712

(22) PCT Filed: Jul. 6, 2012

(86) PCT No.: PCT/SE2012/050802
§ 371 (c)(1),
(2), (4) Date: Jan. 5, 2015

(87) PCT Pub. No.: WO2014/007709
PCT Pub. Date: Jan. 9, 2014

(65) Prior Publication Data
US 2015/0163022 A1    Jun. 11, 2015

(51) Int. Cl.
*H04L 1/18* (2006.01)
*H04W 72/04* (2009.01)
*H04L 5/00* (2006.01)

(52) U.S. Cl.
CPC .......... *H04L 1/1861* (2013.01); *H04L 1/1854* (2013.01); *H04L 5/0055* (2013.01); *H04W 72/0413* (2013.01); *H04L 5/0007* (2013.01)

(58) Field of Classification Search
CPC ..... H04L 1/007; H04L 1/1607; H04L 1/1621; H04L 1/1635; H04L 1/1812;
(Continued)

(56) References Cited

U.S. PATENT DOCUMENTS

| 2007/0223422 A1* | 9/2007 | Kim ............... H04B 7/0417 370/334 |
| 2009/0067379 A1 | 3/2009 | Kim et al. |

(Continued)

FOREIGN PATENT DOCUMENTS

| CN | 101765988 A | 6/2010 |
| EP | 2187545 A1 | 5/2010 |

(Continued)

OTHER PUBLICATIONS

UL ACK/NACK Resource Provisioning, Aug. 2007, Motorola, pp. 1-3.*

(Continued)

*Primary Examiner* — Michael Thier
*Assistant Examiner* — Prince A Mensah
(74) *Attorney, Agent, or Firm* — Sage Patent Group

(57) ABSTRACT

It is presented a method of allocating resources of a first uplink subframe being part of a radio frame, each resource being a combination of a frequency range, and a time slot and a code. The method is performed in a network node and comprises: determining a first set of resources allocated for Hybrid Automatic Repeat Request, HARQ, feedback in the first uplink subframe; determining a second set of resources allocated for HARQ feedback in a second uplink subframe being part of the radio frame; identifying free resources in the first uplink subframe by identifying resources of the second set of resources which have no correspondence in the first set of resources; and allocating when a free resource is found, at least part of the free resources to a use other than HARQ feedback. A corresponding network node is also presented.

14 Claims, 4 Drawing Sheets

(58) Field of Classification Search
CPC ... H04L 1/1854; H04L 1/1861; H04L 5/0007; H04L 5/0055; H04W 72/0406; H04W 72/0413; H04W 72/042; H04W 72/0446
See application file for complete search history.

(56) References Cited

U.S. PATENT DOCUMENTS

| | | | |
|---|---|---|---|
| 2009/0196204 A1* | 8/2009 | Astely | H04L 1/1635 370/280 |
| 2009/0303956 A1* | 12/2009 | Chen | H04L 1/1607 370/329 |
| 2010/0118730 A1 | 5/2010 | Tanaka et al. | |
| 2011/0081932 A1* | 4/2011 | Astely | H04L 5/001 455/509 |
| 2011/0141952 A1* | 6/2011 | Wang | H04L 1/1812 370/294 |
| 2011/0243066 A1* | 10/2011 | Nayeb Nazar | H04L 1/007 370/328 |
| 2011/0268053 A1* | 11/2011 | Che | H04L 1/1621 370/329 |
| 2013/0287047 A1* | 10/2013 | Tanaka | H04L 1/0028 370/496 |

FOREIGN PATENT DOCUMENTS

| | | |
|---|---|---|
| WO | 2008153367 A1 | 12/2008 |
| WO | 2009156838 A1 | 12/2009 |
| WO | 2011022684 A2 | 2/2011 |

OTHER PUBLICATIONS

Unknown, Author, "Un PUCCH Design", Huawei, HiSilicon, 3GPP TSG RAN WGI Meeting #62bis, R1-105256, Xi'an, China, Oct. 11-15, 2010, 1-4.

Unknown, Author, "Implicit mapping between CCE and PUCCH for ACK/NACK TDD", Huawei, CMCC, CATT, TD Tech, 3GPP TSG-RAN-WG1 Meeting #53bis, R1-082359, Warsaw, Poland, Jun. 30-Jul. 4, 2008, 1-4.

Office Action and Search Report for Chinese Application No. 201280074527.8, dated Jul. 6, 2018, 24 pages.

* cited by examiner

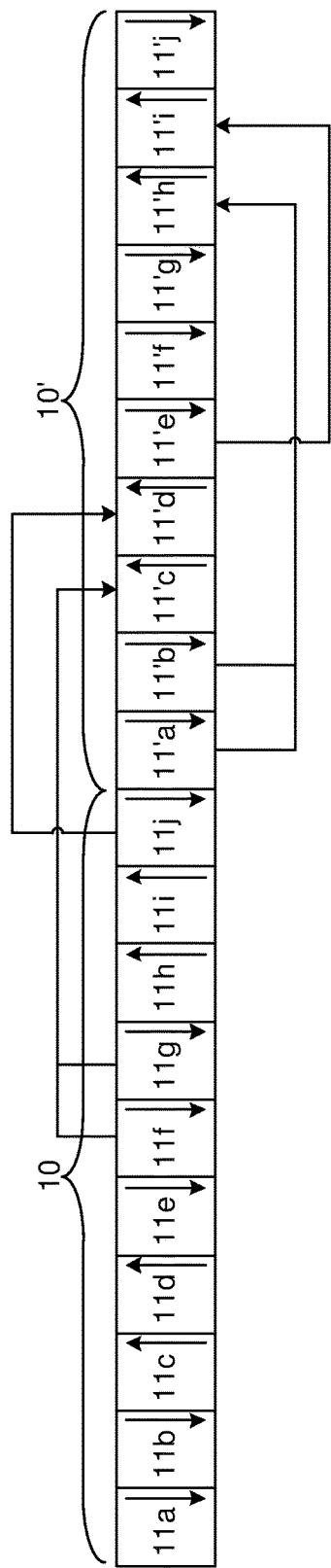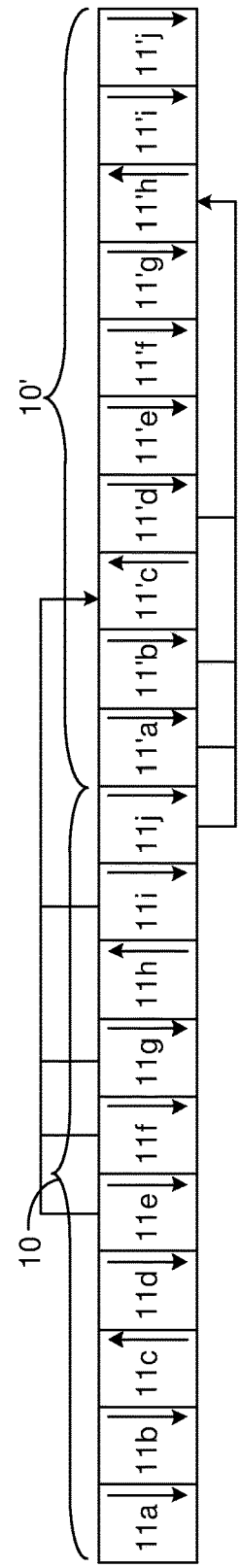
Fig. 2A
Fig. 2B

METHOD AND NETWORK NODE FOR ALLOCATING RESOURCES OF AN UPLINK SUBFRAME

TECHNICAL FIELD

The invention relates to a method and associated network node arranged to allocate resources on an uplink sub-frame.

BACKGROUND

LTE (Long Term Evolution) is a radio access technology standardized by 3GPP (3$^{rd}$ Generation Partnership Project). Only the Packet Switched (PS) domain is supported by LTE, i.e. all services are supported in the PS domain. The standard is based on OFDM (Orthogonal Frequency Division Multiplexing) in the downlink and SC-FDMA (Single Carrier Frequency Domain Multiple Access) in the uplink.

In LTE, no dedicated transport channels are used for traffic. Instead, shared transport channels are used in both downlink and uplink. These shared transport channels, DL-SCH (Downlink Shared Channel) and UL-SCH (Uplink Shared Channel), are each controlled by a scheduler that assigns different parts of the downlink and uplink shared channels to different UEs (User Equipments) for reception and transmission respectively.

In the uplink, the UL-SCH is mapped to a Physical Uplink Shared Channel (PUSCH). Resource usage in the Physical Uplink Shared Channel is very tight and it would be beneficial if it were to be possible to somehow find free resources that could be used for additional control signalling or user data.

SUMMARY

It is an object of embodiments presented herein to utilize free resources in uplink communication in a mobile communication network.

According to a first aspect, it is presented a method of allocating resources of a first uplink subframe being part of a radio frame, each resource being a combination of a frequency range, and a time slot and a code. The method is performed in a network node and comprises: determining a first set of resources allocated for Hybrid Automatic Repeat Request, HARQ, feedback in the first uplink subframe; determining a second set of resources allocated for HARQ feedback in a second uplink subframe being part of the radio frame; identifying free resources in the first uplink subframe by identifying resources of the second set of resources which have no correspondence in the first set of resources; and allocating when a free resource is found, at least part of the free resources to a use other than HARQ feedback. In this way, variations in HARQ feedback usage between subframes are exploited to find free resources. This can result in significant improvement in capacity.

The allocating may comprise allocating at least part of the free resources to a semi-static resource use.

In the allocating, the semi-static resource use may be a resource use selected from the group consisting of a scheduling request, resource for semi-persistent HARQ feedback, and Physical Uplink Control Channel, PUCCH, format 1b with channel selection resource. These are all control data types which could be configured to use free resources in the subframe to improve performance of the mobile communication network.

The allocating may comprise allocating at least part of the free resources to user data. Increased user data transfer is always beneficial.

The method may be repeated for other uplink subframes of the radio frame, wherein each such other uplink subframe is considered a first uplink subframe in the method. In this way, free resources may be identified in more uplink subframes.

The steps of determining a second set of resources and identifying free resources are repeated for any more second uplink subframes which have not been compared with the first subframe to identify free resources. For example, all other uplink subframes of the radio frame, apart from the first uplink subframe may be compared with the first subframe to identify free resources. In this way, there are more opportunities to find free resources for the first uplink subframe.

The identifying free resources may further comprise identifying any free resources in the uplink subframe due to a variation in bundling factor in different uplink subframes, the bundling factor indicating the number of downlink subframes associated with the HARQ feedback in a single uplink subframe. The variation in bundling factor can result in significant differences and thus free resources for a sub-frame with lower bundling factor.

The identifying free resources may comprise determining free resources in the first uplink subframe when the first uplink subframe has a bundling factor being less than the bundling factor of the second uplink subframe.

The identifying free resources may comprise identifying free resources in the first uplink subframe due to a gap in usage for HARQ feedback for a plurality of downlink subframes in a single uplink subframe.

Each resource may be a Physical Uplink Control Channel, PUCCH, format 1, format 1a, or format 1b resource as appropriate.

According to a second aspect, it is presented a network node arranged to allocate resources for a first uplink subframe being part of a radio frame, each resource being a combination of a frequency range, and a time slot and a code. The network node comprises: a processor; and an instruction memory storing instructions that, when executed, causes the network node to: determine a first set of resources allocated for Hybrid Automatic Repeat Request, HARQ, feedback in the first uplink subframe; determine a second set of resources allocated for HARQ feedback in a second uplink subframe being part of the radio frame; identifying free resources in the first uplink subframe by identifying resources of the second set of resources which have no correspondence in the first set of resources; and allocate, when a free resource is found, at least part of the free resources to a use other than HARQ feedback.

The instructions to allocate may comprise allocating at least part of the free resources to a semi-static resource use.

The semi-static resource use may be a resource use selected from the group consisting of a scheduling request, resource for semi-persistent scheduling feedback, and Physical Uplink Control Channel, PUCCH, format 1b with channel selection resource.

The instructions to allocate may comprise instructions to allocate at least part of the free resources to user data.

The instructions to identify free resources may further comprise instructions to identify any free resources in the uplink subframe due to a variation in bundling factor in different uplink subframes, the bundling factor indicating the number of downlink subframes associated with the HARQ feedback in a single uplink subframe.

The instructions to identify free resources may comprise instructions to determine free resources in the first uplink subframe when the first uplink subframe has a bundling factor being less than the bundling factor of the second uplink subframe.

The instructions to identify free resources may comprise instructions to identify free resources in the first uplink subframe due to a gap in usage for HARQ feedback for a plurality of downlink subframes in a single uplink subframe.

It is to be noted that, where appropriate, any feature of the first aspect may be applied to the second aspect.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIGS. 2A-B are schematic diagrams illustrating two different examples of radio frame configurations for use in the mobile communication network of FIG. 1;

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
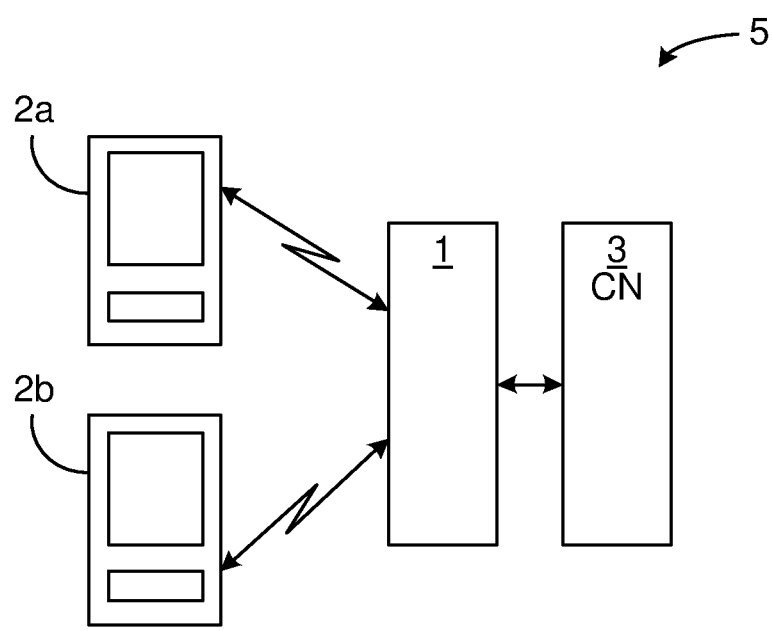
FIG. 1 is a schematic diagram illustrating a mobile communication network 5 where embodiments presented herein may be applied.

FIG. 1 is a schematic diagram illustrating a mobile communication network 5 where embodiments presented herein may be applied. The mobile communications network 5 comprises a core network 3 and one or more network nodes 1, here in the form of radio base stations or evolved Node Bs 1, also known as eNode Bs or eNBs. The network nodes 1 could also be in the form of Node Bs, BTSs (Base Transceiver Stations) and/or BSSs (Base Station Subsystems). The network nodes 1 provide radio connectivity to a plurality of mobile communication terminals 2a-b. The term mobile communication terminal is also known as user equipment, mobile terminal, user terminal, user agent, etc.

The mobile communication network 5 may e.g. comply with any one or a combination of LTE (Long Term Evolution), W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), etc., as long as the principles described hereinafter are applicable.

The communication between each one of the mobile communication terminals 2a-b and the radio base station 1 occurs over a wireless radio interface. The network nodes 1 are also connected to a core network 3 for connectivity to central functions and other networks.

FIGS. 2A-B are schematic diagrams illustrating two different examples of radio frame configurations for use in the mobile communication network of FIG. 1. In the configuration shown in FIG. 2A, a first radio frame 10 comprises ten subframes 11a-j. Of these, six subframes 11a-b, 11e-g, 11j are configured to be downlink subframes and four subframes 11c-d, 11h-i are configured to be uplink subframes as indicated by the arrows within the sub-frames. The next, second, radio frame 10' and its ten subframes 11'a-11'j are configured the same way. The same configuration continues until it is changed by the network, e.g. due to a change in load or radio conditions.

Hybrid automatic repeat request (HARQ) comprises the use of negative feedback (NACK) from a receiver to a transmitter when decoding is unsuccessful, and positive feedback (ACK) from the receiver to the transmitter when decoding is successful.

In the exemplary configuration FIGS. 2A-B, HARQ feedback (ACK/NACK) is illustrated with arrows from downlink subframes to uplink subframes. Hence, each downlink transmission results in HARQ feedback in a later uplink subframe. The reverse process, with HARQ feedback for uplink transmissions is not shown here.

Here, only HARQ feedback transmitted in uplink subframes of the second radio frame 10' is shown, but the feedback is repeated in the same way for future radio frames.

In FIG. 2A, the HARQ feedback for both the sixth and seventh subframes 11f-g of the first radio frame 10 is sent in the third subframe 11'c of the second radio frame 10'. The term bundling factor is used to indicate the number of downlink subframes associated with the HARQ feedback in a single uplink subframe. Hence, since the feedback from two downlink subframes are combined in the uplink subframe 11'c, the bundling factor for this subframe 11'c is two.

For the ninth subframe 11j of the first radio frame 10, HARQ feedback is sent in the fourth subframe 11'd of the second radio frame 10'. The fourth subframe 11'd of the second radio frame 10' thus has a bundling factor of one.

The HARQ feedback for both the first and second subframes 11'a-b of the second radio frame 10' is sent in the eighth subframe 11'h of the second radio frame 10'. Since the feedback from two downlink subframes are combined in this uplink subframe 11'h, the bundling factor for this subframe 11'h is two.

For the fifth subframe 11'e of the second radio frame 10', HARQ feedback is sent in the ninth subframe 11'i of the second radio frame 10'. The ninth subframe 11'i of the second radio frame 10' thus has a bundling factor of one.

Consequently, it can be seen that the bundling factor easily can vary between uplink subframes.

In the configuration shown in FIG. 2B, the first radio frame comprises eight subframes 11a-b, 11d-g, 11i-j which are configured to be downlink subframes and two subframes 11c, 11h are configured to be uplink subframes. As for the configuration of FIG. 2A, the next, second, radio frame 10' and its ten subframes 11'a-11'j are configured the same way. Again, the same configuration continues until it is changed by the network, e.g. due to a change in load or radio conditions.

The HARQ feedback for the fifth, sixth, seventh and ninth subframes 11e-g, 11i of the first radio frame 10 is sent in the third subframe 11'c of the second radio frame 10'. Hence, the bundling factor for this subframe 11'c is here four.

The HARQ feedback for the tenth subframe 11j of the first radio frame 10 and for the first, second and fourth subframes 11'a-b, 11'd of the second radio frame 10' is sent in the eighth subframe 11'h of the second radio frame 10'. Hence, the bundling factor for this subframe 11'c is here also four.

Figure 3:
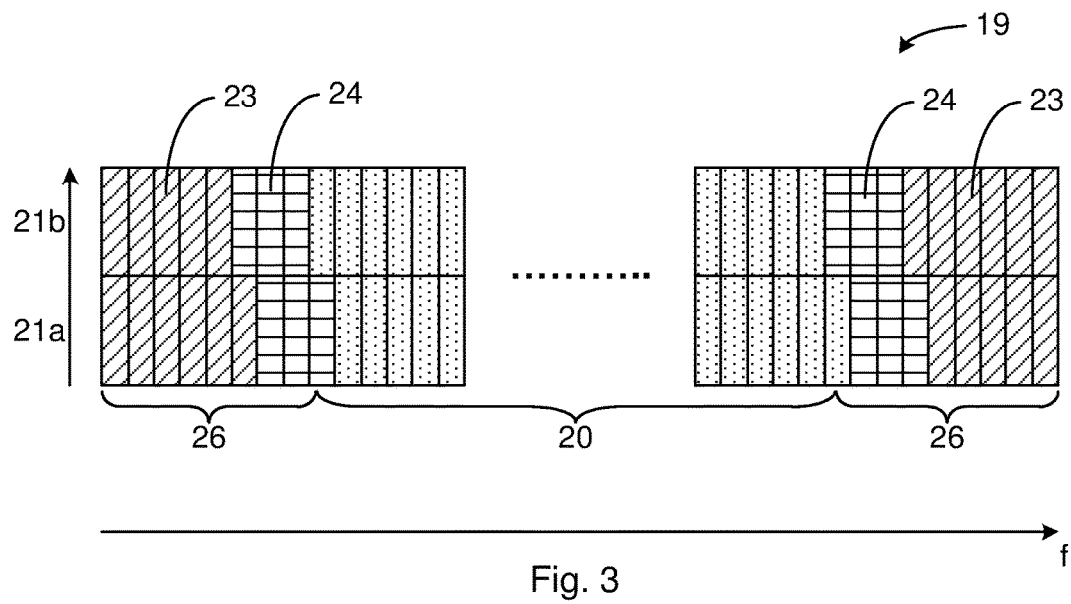
FIG. 3 is a schematic diagram illustrating resource allocations of a subframe of the radio frames of FIG. 1.

FIG. 3 is a schematic diagram illustrating resource allocations of a subframe of the radio frames of FIG. 1. Some details of LTE will now be described to set a context for embodiments presented herein. However, it is to be noted that the embodiments presented herein are not limited to be used with LTE.

In the time domain, one subframe of 1 ms duration (equal to 2 slots of 0.5 ms each) is divided into 12 or 14 OFDM (Orthogonal Frequency Division Multiplexing) or SC-FDMA (Single-carrier Frequency Division Multiple Access) symbols, depending on the configuration. One OFDM (or SC-FDMA) symbol consists of a number of sub carriers in the frequency domain, depending on the channel bandwidth and configuration. One OFDM (or SC-FDMA) symbol on one sub carrier is referred to as an RE (Resource Element). Twelve sub-carriers on one slot are referred to as a Physical Resource Block (PRB).

In LTE, no dedicated transport channels are used for traffic. Instead, shared transport channels are used in both downlink and uplink. These shared transport channels, DL-SCH (Downlink Shared Channel) and UL-SCH (Uplink Shared Channel), are each controlled by a scheduler that assigns different parts of the downlink and uplink shared channels to different UEs for reception and transmission respectively.

The embodiments presented herein relate to uplink. In the uplink, the UL-SCH is mapped to the Physical Uplink Shared Channel (PUSCH) 20, for carrying user data. On the spectrum band edges, a control region 26 is located. In this control region 26, the Physical Uplink Control Channel (PUCCH) is transmitted. The PUCCH carries Channel Status Indications (CSI), Scheduling Request (SR) messages, and Hybrid Automatic Repeat Request (HARQ) feedback related to downlink data.

CSI and SR are always transmitted on semi-statically configured PUCCH resources. HARQ feedback reports, comprising of ACK/NACKs related to previously received downlink data, are transmitted in a dynamic region of the PUCCH.

In the spectrum assigned for PUCCH, code division multiplexing is used to enable multiple PUCCH resources to share one Physical Resource Block (PRB).

The CSI is also denoted PUCCH Formats 2/2a/2b transmissions (here called "Format 2" for short) and transmitted on an outer part 23 of PUCCH that is closest to the spectrum band edge. The HARQ feedback reports and the SR are denoted PUCCH Formats 1/1a/1b (here called "Format 1" for short) and transmitted in an inner part 24 of PUCCH that is closer to the spectrum band center.

Using various parameters, the location of the scheduling requests is configurable all the way up to the system bandwidth center. It is thus possible to place SR resources closer to the band center than the HARQ feedback resources.

It should be noted that the starting position for the different regions will be the same in all uplink subframes, as there is no dependency of the slot or subframe numbers on the starting location.

The maximum size of the HARQ feedback region will be proportional to the maximum number of Control Channel Elements (CCEs) used in the downlink subframe carrying the corresponding downlink assignments. In the general case, the standard allows for different numbers of downlink OFDM symbols being used for the downlink control region in different subframes. It is thus possible to have different numbers of CCEs, and subsequently different sizes of the HARQ feedback region in different uplink subframes.

As explained above, with reference to FIGS. 2A-B, for some of the TDD (Time Division Duplex) configurations, the uplink HARQ feedback signals also need to be bundled from two or more downlink subframes into one uplink subframe. Some of these TDD configurations also carry HARQ feedback from different number of downlink subframes in different uplink subframes, expressed as different bundling factors.

A UE can be assigned dedicated PUCCH format 1 resources for different tasks such as Scheduling Request, HARQ repetition, Semi-Persistent Scheduling HARQ or HARQ Channel Selection.

A Scheduling Request resources is used by the UE to request an UL-SCH resource

A HARQ repetition resources can e.g. be assigned to UE's at cell the edge to allow for the UE to repeat the ACK/NACK several times in order to improve the reception probability.

In order to save Physical Downlink Control Channel (PDCCH) resources it is possible to assign a Semi-Persistent Scheduling (SPS) of PDSCH resources blocks to a UE. It is then also necessary to set up a semi-static PUCCH format 1 resource for to UE to transmit ACK/NACK on.

HARQ Channel Selection resources can be assigned to UE's which need to transmit more than two ACK/NACK bits in one HARQ transmission (in LTE Rel-8 and Rel-9 a maximum of two bits are possible, but in Rel-10 up to 4 bits can be sent by using Channel Selection)

Figure 4A:
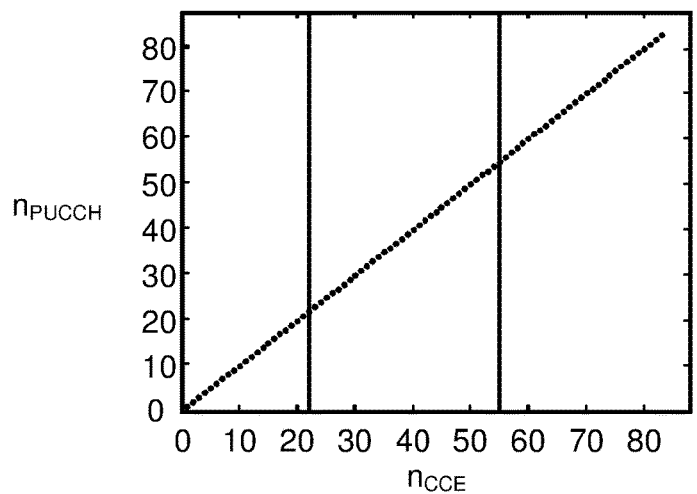
FIGS. 4A-B are schematic graphs illustrating resource usage for HARQ feedback in an uplink subframe under two different scenarios.
Figure 4B:
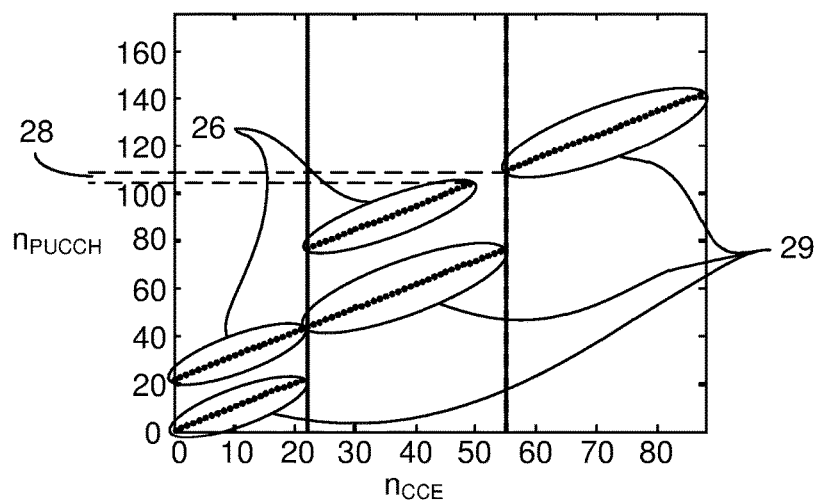

FIGS. 4A-B are schematic graphs illustrating resource usage for HARQ feedback in an uplink subframe in two different scenarios. The horizontal axes represent an index $n_{CCE}$ pointing to a corresponding CCE for which the HARQ feedback relates. The vertical axes represent an index $n_{PUCCH}$ pointing to where in the PUCCH the HARQ feedback is located, counted from where the HARQ feedback elements start. Each resource block contains several HARQ feedback elements.

In FIG. 4A, the HARQ feedback relate to a single previous downlink subframe. HARQ feedback elements indexed from 0 to 83 are used and relate to CCEs indexed 0 to 83 of the corresponding subframe. In other words, the bundling factor for the uplink subframe in this scenario is one.

In FIG. 4B, HARQ feedback in the uplink subframe relates to elements of two previous downlink subframes. Hence, the bundling factor here is two. A first set 26 of HARQ feedback elements relates to a first previous downlink subframe and a second set 29 of HARQ feedback elements relates to a second previous downlink subframe. It can be seen that there is a gap 28 in usage of the PUCCH indices.

Note also that there is a difference in maximum $n_{PUCCH}$ index used between the scenarios shown in FIGS. 4A-B. The maximum $n_{PUCCH}$ index of the scenario of FIG. 4A is 83, while the highest maximum $n_{PUCCH}$ index of the scenario of FIG. 4B is 142.

It has been realized that these variations in usage between subframes result in free resources in some subframes which may be used for other purposes than HARQ feedback.

The size of the active HARQ feedback region may vary in different uplink subframes due to at least three reasons.

Firstly, the bundling factor varies between the different uplink subframes, resulting in different number of HARQ feedback items that are needed. As mentioned above, see e.g. the difference in maximum $n_{PUCCH}$ index used, 83 vs. 142, for the two examples with bundling factor one and two.

Secondly, when the bundling factor is greater than one, it is possible that the PUCCH HARQ feedback index space is non-contiguous. See, for example, in FIG. 4B, where $n_{PUCCH}$ indices 105 to 109 are not used at all, creating a gap 28 in resource usage.

This case occurs for TDD uplink subframes that carry HARQ feedback for more than one downlink subframe, and when there are gaps in the HARQ feedback resource index ($n_{PUCCH}$) sequence, either due to some downlink subframes carrying more PHICH groups than other downlink subframes, or due to extended cyclic prefix being used. This can result in fewer CCEs being available in some downlink subframes, which in turn results in jumps in the HARQ feedback sequence caused by the fixed regions.

Thirdly, when the bundling factor is equal to one, the size of the HARQ feedback index space can differ between uplink subframes due to differences in the number of PHICH groups that the corresponding downlink subframe is carrying. This is similar to the second case, but here the gap is located at the end of the HARQ feedback region.

Combinations of the various reasons are also possible.

This variation in resource usage between subframes can be used as free resources in subframes where the HARQ feedback resource usage is less than for other subframes.

Figure 5A:
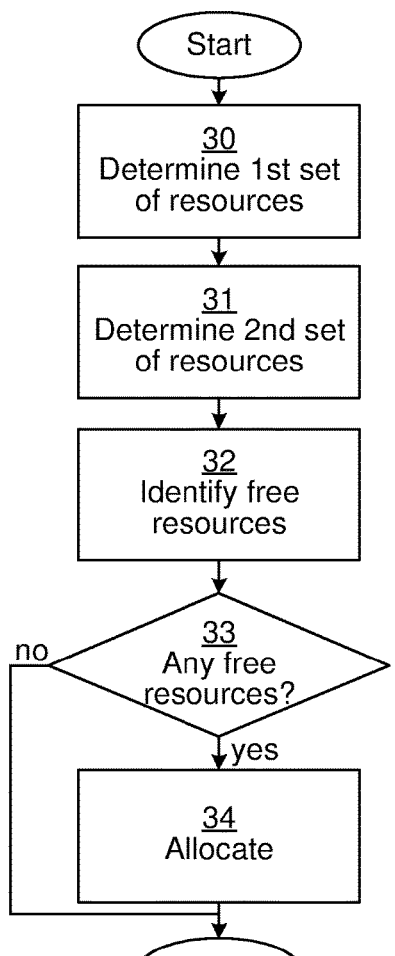
FIGS. 5A-B are flow charts illustrating resource allocation in a network node of FIG. 1 using the principles explained with the examples of FIGS. 2A-B, 3 and 4A-B above.
Figure 5B:
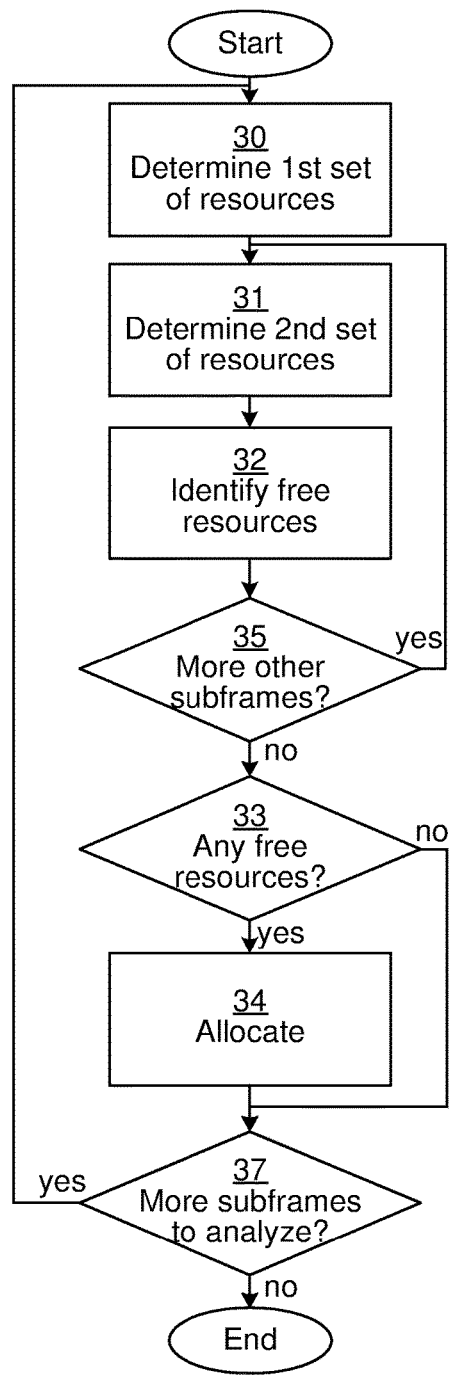

FIGS. 5A-B are flow charts illustrating resource allocation in a network node of FIG. 1 using the principles explained with the examples of FIGS. 2A-B, 3 and 4A-B above. The methods are performed in the network node 1 of FIG. 1 and relate to allocating resources of a first uplink subframe being part of a radio frame. The first uplink subframe is thus used as a term to indicate the subframe being analyzed for potential free resources and does not indicate a particular position as such within the radio frame. Each resource is a combination of a frequency range, a time slot and a code and is associated with a particular UE. In one example, each resource may be a PUCCH format 1, format 1a or format 1b resource.

Firstly, the method shown in FIG. 5A will be explained.

In an initial determine first set of resources step 30, a first set of resources allocated for HARQ feedback in the first uplink subframe is determined.

In a determine second set of resources step 31, a second set of resources allocated for HARQ feedback in a second uplink subframe being part of the radio frame is determined. The second uplink subframe is any other subframe of the radio frame than the first subframe.

In an identify free resources step 32, free resources are identified in the first uplink subframe by identifying resources of the second set of resources which have no correspondence in the first set of resources. Hence, any free resources are found by finding $n_{PUCCH}$ of the second set of resources which are do not form part of the first set of resources, due to variations in resource usage for HARQ feedback between subframes.

The identification of free resources in the uplink subframe may occur due to a variation in bundling factor in different uplink subframes, as exemplified in FIGS. 4A-B above. In particular, a subframe with a lower bundling factor typically uses less HARQ feedback resources than a subframe with a higher bundling factor. Bundling factor is a parameter which is readily available to obtain. By comparing bundling factors, it is provided a simple way to identify any free resources. See for example the difference in $n_{PUCCH}$ usage in FIGS. 4A and 4B. In FIG. 4B, where the bundling factor is two, the maximum $n_{PUCCH}$ used is 142, while in FIG. 4A, where the bundling factor is one, the maximum $n_{PUCCH}$ used is 83.

The identification of free resources in the first uplink subframe may also occur due to a gap in usage for HARQ feedback for a plurality of downlink subframes in a single uplink subframe, as illustrated in FIG. 4B and explained in more detail above.

In a conditional any free resources step 33, the method is directed to an allocate step of there are any free resources. Otherwise, the method ends.

In the allocate step 34, when at least one free resource is found, at least part of the free resources are allocated to a use other than HARQ feedback. In this way, the free resource may be utilized for productive purposes in the first subframe. This allocation may optionally persist until the configuration of the radio frame is changed.

This step may allocate at least part of the free resources to a semi-static resource use, such as scheduling requests, resource for semi-persistent HARQ feedback, and PUCCH format 1b with channel selection resource. Scheduling requests is a scarce resource. A UE without sufficient resources for scheduling requests is forced to use the Random Access procedure to request UL shared channel resources. A Random Access attempt is much more expensive, in terms of air interface resources, signalling, processing load, etc., to the system than a scheduling request attempt.

Optionally, this step may allocate at least part of the free resources to user data, such as PUSCH. This is particularly useful when there are free resources found adjacent to previous PUSCH allocations, such that at least one additional complete PRB is made available.

The method shown in FIG. 5B is an extension to the method shown in FIG. 5A and steps which have previously explained for FIG. 5A will not be explained again unless they differ in some way.

After the identify free resources step 32, there is a conditional more other subframes step 35. In this step it is determined whether there are more other (than the first subframe) uplink subframes which have not been compared with the first subframe to identify free resources. If the condition is true, the method returns to the determine second set of resources step 31, where the new other uplink subframe becomes a new second uplink subframe for the determine second set of resources step 31.

In this embodiment, if no free resources are found, the method continues from the conditional any free resources step 33 to a conditional more subframes to analyze step 37.

In this embodiment, after the allocate step 34, there is a conditional more subframes to analyze step 37. In this step it is determined whether there are more uplink subframes of the radio frame which have not been analyzed as to whether there are any free resources. If this condition is true, the method returns to the determine first set of resources step 30, where the new uplink subframe to analyze becomes a new first subframe for the determine first set of resources step 30.

The embodiments presented herein make more efficient use of the available uplink radio interface, hence either increasing the uplink peak throughput (if the HARQ feedback resources are allocated to PUSCH), or increasing the control signalling such as scheduling request capacity.

Table 1 and Table 2 below present examples of capacity gain for carrying scheduling requests in a radio frame for TDD configuration 1 and 10 MHz and 20 MHz, respectively. In the tables, CFI (Control Format Indicator) indicates the format of the control channel, which results in various maximum number of CCEs, CCEmax. NF1 is the number of format 1 PUCCH PRB pairs used. The column "Legacy space for SR" indicates the number of available resources for scheduling requests in a radio frame if all uplink subframes are treated identically, as known in the prior art. The column "Improved space for SR" indicates the number of available resources for scheduling requests in a radio frame if the method described above is used.

TABLE 1

Improvement in scheduling request capacity for 10 MHz, TDD1

| CFI | CCEmax | NF1 | Legacy space for SR | Improved space for SR | Improvement |
|---|---|---|---|---|---|
| 1 | 11 | 2 | 200 | 222 | 11.00% |
|   | 11 | 3 | 344 | 366 | 6.40% |
|   | 11 | 4 | 488 | 510 | 4.51% |
| 2 | 27 | 2 | 72  | 126 | 75.00% |
|   | 27 | 3 | 216 | 270 | 25.00% |
|   | 27 | 4 | 360 | 414 | 15.00% |
| 3 | 44 | 3 | 80  | 168 | 110.00% |
|   | 44 | 4 | 224 | 312 | 39.29% |
|   | 44 | 5 | 368 | 456 | 23.91% |

TABLE 2

Improvement in scheduling request capacity for 20 MHz, TDD1

| CFI | CCEmax | NF1 | Legacy space for SR | Improved space for SR | Improvement |
|---|---|---|---|---|---|
| 1 | 22 | 2 | 112 | 156 | 39.29% |
|   | 22 | 3 | 256 | 300 | 17.19% |
|   | 22 | 4 | 400 | 444 | 11.00% |
| 2 | 55 | 4 | 136 | 246 | 80.88% |
|   | 55 | 5 | 280 | 390 | 39.29% |
|   | 55 | 6 | 424 | 534 | 25.94% |
| 3 | 88 | 5 | 16  | 192 | 1100.00% |
|   | 88 | 6 | 160 | 336 | 110.00% |
|   | 88 | 7 | 304 | 480 | 57.89% |

If, instead, PUSCH capacity is increased in preference to scheduling request capacity, it is expected that typically one or two PUSCH PRBs can be added. This corresponds to a about 2 to 5% upload capacity increase for that subframe (in a 10 MHz system). This increase may seem small relative to the potential SR increase, but UL SCH capacity may be more highly valued, particularly in TDD systems, resulting in a significant improvement.

Figure 6:
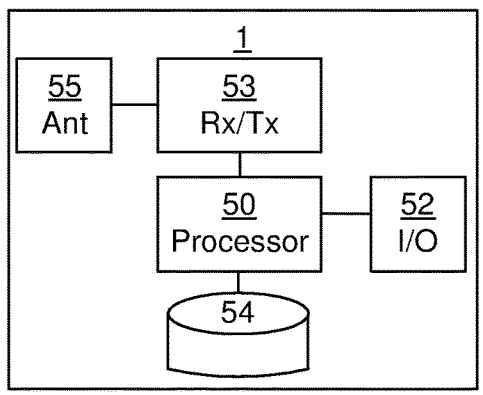
FIG. 6 is a schematic diagram illustrating some components of the network node of FIG. 1.

FIG. 6 is a schematic diagram illustrating some components of the network node of FIG. 1.

A processor 50 is provided using any combination of one or more of a suitable central processing unit (CPU), multi-processor, microcontroller, digital signal processor (DSP), application specific integrated circuit etc., capable of executing software instructions stored in a computer program product 54, e.g. in the form of a memory. The processor 50 may be configured to execute the method described with reference to FIGS. 5A-B above.

The computer program product 54 may be a memory or any combination of read and write memory (RAM) and read only memory (ROM). The memory also comprises persistent storage, which, for example, may be any single one or combination of magnetic memory, optical memory, solid state memory or even remotely mounted memory.

The network node 1 further comprises an I/O interface 52 for communicating with the core network and optionally with other network nodes.

The network node 1 also comprises one or more transceivers 53, comprising analogue and digital components, and a suitable number of antennas 55 for radio communication with mobile communication terminals within one or more radio cells. The processor 50 controls the general operation of the network node 1, e.g. by sending control signals to the transceiver 53 and receiving reports from the transceiver 53 of its operation.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of allocating resources of a first uplink subframe being part of a radio frame, each resource being a combination of a frequency range, a time slot and a code, the method being performed in a network node and comprising:
   determining a first set of resources allocated for Hybrid Automatic Repeat Request (HARQ) feedback in the first uplink subframe;
   determining a second set of resources allocated for HARQ feedback in a second uplink subframe being part of the radio frame;
   identifying free resources in the first uplink subframe based upon resource usage of the second set of resources, wherein each free resource is identified by finding a HARQ feedback resource index of the second set of resources that does not form part of the first set of resources allocated for HARQ feedback; and
   allocating at least part of the identified free resources to a use other than HARQ feedback, and wherein at least part of the free resources is allocated to a semi-static resource use,
   wherein identifying free resources further comprises identifying any free resources in the first uplink subframe due to a variation in bundling factor in different uplink subframes, the bundling factor indicating the number of downlink subframes associated with the HARQ feedback in a single uplink subframe.

2. The method of claim 1, wherein the semi-static resource use is a resource use selected from the group consisting of a scheduling request and a Physical Uplink Control Channel (PUCCH) format 1b with channel selection resource.

3. The method of claim 1, wherein the allocating comprises allocating at least part of the free resources to user data.

4. The method of claim 1, wherein the method is repeated for other uplink subframes of the radio frame, wherein each such other uplink subframe is considered a first uplink subframe in the method.

5. The method of claim 1, wherein the steps of determining a second set of resources and identifying free resources are repeated for a third uplink subframe.

6. The method of claim 1, wherein identifying free resources comprises determining free resources in the first uplink subframe when the first uplink subframe has a bundling factor that is less than a bundling factor of the second uplink subframe.

7. The method of claim 1, wherein identifying free resources comprises identifying free resources in the first uplink subframe due to a gap in usage for HARQ feedback for a plurality of downlink subframes in a single uplink subframe.

8. The method of claim 1, wherein each resource is a Physical Uplink Control Channel (PUCCH) format 1, format 1a, or format 1b resource, as appropriate.

9. A network node arranged to allocate resources for a first uplink subframe being part of a radio frame, each resource being a combination of a frequency range, a time slot and a code, the network node comprising:
   a processor; and
   an instruction memory storing instructions that, when executed, cause the network node to:
   determine a first set of resources allocated for Hybrid Automatic Repeat Request (HARQ) feedback in the first uplink subframe;
   determine a second set of resources allocated for HARQ feedback in a second uplink subframe being part of the radio frame;
   identify free resources in the first uplink subframe based upon resource usage of the second set of resources, wherein each free resource is identified by finding a HARQ feedback resource index of the second set of resources that does not form part of the first set of resources allocated for HARQ feedback; and allocate at least part of the identified free resources to a use other than HARQ feedback, and wherein at least part of the free resources is allocated to a semi static resource use, wherein the instructions to identify free resources, comprise instructions to identify any free resources in the first uplink subframe due to a variation in bundling factor in different uplink subframes, the bundling factor indicating the number of downlink subframes associated with the HARQ feedback in a single uplink subframe.

10. The network node of claim 9, wherein the semi-static resource use is a resource use selected from the group consisting of a scheduling request, and a Physical Uplink Control Channel (PUCCH) format 1b with channel selection resource.

11. The network node of claim 9, wherein the instructions to allocate comprise instructions to allocate at least part of the free resources to user data.

12. The network node of claim 9, wherein the instructions to identify free resources comprise instructions to determine free resources in the first uplink subframe when the first uplink subframe has a bundling factor that is less than a bundling factor of the second uplink subframe.

13. The network node of claim 9, wherein the instructions to identify free resources comprise instructions to identify free resources in the first uplink subframe due to a gap in usage for HARQ feedback for a plurality of downlink subframes in a single uplink subframe.

14. A method of allocating resources of a first uplink subframe being part of a radio frame, each resource being a combination of a frequency range, a time slot and a code, the method being performed in a network node and comprising:
   determining a first set of resources allocated for Hybrid Automatic Repeat Request (HARQ) feedback in the first uplink subframe;
   determining a second set of resources allocated for HARQ feedback in a second uplink subframe being part of the radio frame, wherein the second uplink subframe does not overlap in time with the first uplink subframe;
   identifying free resources in the first uplink subframe by identifying resources of the second set of resources that have no correspondence in the first set of resources; and
   allocating at least part of the identified free resources to a use other than HARQ feedback,
   wherein identifying free resources further comprises identifying any free resources in the first uplink subframe due to a variation in bundling factor in different uplink subframes, the bundling factor indicating the number of downlink subframes associated with the HARQ feedback in a single uplink subframe.

* * * * *